(12) United States Patent
Balk et al.

(10) Patent No.: US 7,596,217 B2
(45) Date of Patent: Sep. 29, 2009

(54) SYSTEMS AND METHODS FOR PHONE CALL MANAGEMENT

(75) Inventors: Igor Balk, Brighton, MA (US); David Michael Choupak, Cupertino, CA (US)

(73) Assignee: Unison Technologies, Inc., New York, NY (US)

( * ) Notice: Subject to any disclaimer, the term of this patent is extended or adjusted under 35 U.S.C. 154(b) by 0 days.

(21) Appl. No.: 12/277,999

(22) Filed: Nov. 25, 2008

(65) Prior Publication Data

US 2009/0067595 A1 Mar. 12, 2009

Related U.S. Application Data

(63) Continuation of application No. 11/743,059, filed on May 1, 2007.

(51) Int. Cl.
*H04M 3/42* (2006.01)
(52) U.S. Cl. .................. 379/212.01; 379/376.01; 379/214.01
(58) Field of Classification Search ............ 379/210.01, 379/88.13, 205.01, 202.01, 204.01, 207.01, 379/158, 93.21, 212.01, 376.01, 214.01; 709/206, 227
See application file for complete search history.

(56) References Cited

U.S. PATENT DOCUMENTS

| | | | |
|---|---|---|---|
| 1,479,442 A | 1/1924 | Adendorff | 379/111 |
| 3,221,107 A | 11/1965 | Seemann et al. | 179/18 |
| 3,479,465 A | 11/1969 | Masucci | 179/18 |
| 4,953,159 A | 8/1990 | Hayden et al. | 370/62 |
| 5,012,511 A | 4/1991 | Hanle et al. | 379/211 |
| 5,060,255 A | 10/1991 | Brown | 379/67 |
| 5,309,513 A | 5/1994 | Rose | 379/265.12 |
| 5,327,486 A * | 7/1994 | Wolff et al. | 379/93.23 |
| 5,335,269 A | 8/1994 | Steinlicht | 379/266.05 |
| 5,515,428 A | 5/1996 | Sestak et al. | 379/266 |
| 5,557,667 A | 9/1996 | Bruno et al. | 379/201 |
| 5,647,002 A | 7/1997 | Brunson et al. | 380/49 |
| 5,654,961 A | 8/1997 | Araujo et al. | 370/263 |
| 5,696,809 A | 12/1997 | Voit | 379/5 |
| 5,740,237 A | 4/1998 | Malik et al. | 379/211 |
| 5,796,394 A | 8/1998 | Wicks et al. | 345/329 |
| 5,875,302 A | 2/1999 | Obhan | 395/200.55 |
| 6,069,949 A | 5/2000 | Schuenhoff et al. | 379/242 |
| 6,192,048 B1 | 2/2001 | Nelson et al. | 370/380 |
| 6,208,658 B1 | 3/2001 | Pickett | 370/401 |
| 6,212,268 B1 * | 4/2001 | Nielsen | 379/210.01 |
| 6,285,752 B1 | 9/2001 | Rice | 379/266.07 |

(Continued)

FOREIGN PATENT DOCUMENTS

EP 0 510 411 A2 10/1992

(Continued)

OTHER PUBLICATIONS

Lotus Software: "IBM Lotus Notes 6.5.1" Internet Citation, [Online] XP002361633 Retrieved from the Internet: URL:ftp:llftp.lotus.com/pub/lotusweb/product/LotusNotes651.pdf> [retrieved on Jan. 4, 2006] the whole document.

(Continued)

*Primary Examiner*—Olisa Anwah
(74) *Attorney, Agent, or Firm*—Winston & Strawn LLP

(57) ABSTRACT

A communication system includes client software operating on a PC, or similar platform, and a client telephone that is connected to a call routing server. A user manages telephone communication, including incoming and outgoing calls, conference calls and call forwarding, through the client software. The client software commands the call routing server using instant messenger communication.

8 Claims, 2 Drawing Sheets

(Changing Presence State)

U.S. PATENT DOCUMENTS

| | | |
|---|---|---|
| 6,324,264 B1 * | 11/2001 | Wiener et al. ............ 379/88.22 |
| 6,404,747 B1 | 6/2002 | Berry et al. ................. 370/270 |
| 6,438,222 B1 | 8/2002 | Burg ...................... 379/215.01 |
| 6,442,268 B1 | 8/2002 | Klaghofer et al. ........... 379/229 |
| 6,529,502 B2 | 3/2003 | Sarkissian et al. ........... 370/353 |
| 6,560,222 B1 | 5/2003 | Pounds et al. ................ 370/353 |
| 6,580,787 B1 | 6/2003 | Akhteruzzaman et al. ...................... 379/88.22 |
| 6,587,556 B1 | 7/2003 | Judkins et al. ............... 379/219 |
| 6,625,141 B1 | 9/2003 | Glitho et al. ................. 370/352 |
| 6,633,848 B1 | 10/2003 | Johnson et al. .............. 704/277 |
| 6,640,230 B1 * | 10/2003 | Alexander et al. ............. 707/10 |
| 6,658,095 B1 | 12/2003 | Yoakum et al. ........... 479/93.01 |
| 6,747,970 B1 * | 6/2004 | Lamb et al. .................. 370/352 |
| 6,766,012 B1 | 7/2004 | Crossley ................ 379/265.02 |
| 6,792,085 B1 | 9/2004 | Rigaldies et al. ......... 379/88.13 |
| 6,807,254 B1 | 10/2004 | Guedalia et al. ............ 379/88.1 |
| 6,810,116 B1 | 10/2004 | Sorensen et al. ........ 379/202.01 |
| 6,816,578 B1 | 11/2004 | Kredo et al. ............. 379/88.17 |
| 6,816,589 B2 | 11/2004 | Pinard ................... 379/265.01 |
| 6,832,245 B1 | 12/2004 | Isaacs et al. ................ 709/206 |
| 6,836,480 B2 | 12/2004 | Basso et al. ................. 370/390 |
| 6,836,893 B2 | 12/2004 | Pinard ........................ 719/317 |
| 6,839,736 B1 | 1/2005 | Kajita et al. ................ 709/206 |
| 6,895,558 B1 | 5/2005 | Loveland ..................... 715/746 |
| 6,904,140 B2 | 6/2005 | Trossen ................. 379/207.04 |
| 6,917,610 B1 | 7/2005 | Kung et al. .................. 370/352 |
| 6,920,208 B1 | 7/2005 | Rosen et al. ................. 379/126 |
| 6,985,576 B1 | 1/2006 | Huck .................... 379/265.09 |
| 7,003,091 B1 | 2/2006 | Burns et al. ............. 379/265.11 |
| 7,007,085 B1 | 2/2006 | Malik ......................... 709/204 |
| 7,023,980 B2 | 4/2006 | Lenard .................. 379/266.07 |
| 7,027,463 B2 | 4/2006 | Mathew ...................... 370/463 |
| 7,039,411 B2 | 5/2006 | Purdy et al. .................. 455/445 |
| 7,047,030 B2 | 5/2006 | Forysyth ..................... 455/518 |
| 7,062,021 B2 | 6/2006 | Starbuck et al. ........... 379/88.21 |
| 7,076,043 B2 | 7/2006 | Curbow et al. .......... 379/201.06 |
| 7,103,167 B2 | 9/2006 | Brahm et al. ........... 379/211.02 |
| 7,117,445 B2 | 10/2006 | Berger ........................ 715/752 |
| 7,136,475 B1 * | 11/2006 | Rogers et al. .......... 379/213.01 |
| 7,180,888 B1 | 2/2007 | Crouch et al. ................ 370/352 |
| 7,184,525 B2 | 2/2007 | Arnoff et al. .............. 379/88.25 |
| 7,185,054 B1 | 2/2007 | Ludwig et al. .............. 709/204 |
| 7,187,761 B2 * | 3/2007 | Bookstaff .............. 379/201.01 |
| 7,194,523 B2 | 3/2007 | Nelson et al. ................ 709/218 |
| 7,212,617 B2 | 5/2007 | Owens et al. ............. 379/93.24 |
| 7,222,156 B2 | 5/2007 | Gupta et al. ................. 709/206 |
| 7,224,774 B1 | 5/2007 | Brown et al. .............. 379/88.14 |
| 7,245,711 B2 | 7/2007 | Margolis ................. 379/209.01 |
| 7,254,641 B2 | 8/2007 | Broughton et al. .......... 709/240 |
| 7,269,163 B1 * | 9/2007 | Koch et al. .................. 370/352 |
| 7,274,778 B2 | 9/2007 | Hanson et al. ............. 379/90.01 |
| 7,286,661 B1 | 10/2007 | Balk et al. .............. 379/265.01 |
| 7,313,617 B2 | 12/2007 | Malik et al. ................. 709/225 |
| 7,334,021 B1 * | 2/2008 | Fletcher ....................... 709/206 |
| 7,382,868 B2 | 6/2008 | Moore et al. ............ 379/114.01 |
| 7,412,657 B2 * | 8/2008 | Forlenza et al. ............. 715/751 |
| 7,424,537 B2 | 9/2008 | Bennett et al. .............. 709/227 |
| 2002/0075304 A1 | 6/2002 | Thompson et al. .......... 345/751 |
| 2002/0076025 A1 | 6/2002 | Liversidge et al. ..... 379/202.01 |
| 2002/0085701 A1 | 7/2002 | Parsons et al. ......... 379/211.01 |
| 2002/0098831 A1 | 7/2002 | Castell et al. ................ 455/413 |
| 2002/0099777 A1 | 7/2002 | Gupta et al. ................. 709/206 |
| 2002/0116461 A1 | 8/2002 | Diacakis et al. ............. 709/204 |
| 2003/0023691 A1 | 1/2003 | Knauerhase ................. 709/206 |
| 2003/0035528 A1 | 2/2003 | Baker .................... 378/207.04 |
| 2003/0037113 A1 | 2/2003 | Petrovykh ................... 709/205 |
| 2003/0041048 A1 | 2/2003 | Balasuriya ..................... 707/1 |
| 2003/0123431 A1 | 7/2003 | Geck et al. .................. 370/352 |
| 2003/0129967 A1 | 7/2003 | Verona ........................ 455/412 |
| 2003/0135569 A1 | 7/2003 | Khakoo et al. .............. 709/206 |
| 2003/0152203 A1 | 8/2003 | Berger et al. .............. 379/93.24 |
| 2003/0163819 A1 | 8/2003 | Lee et al. ....................... 725/61 |
| 2003/0174815 A1 | 9/2003 | Didcock et al. ........... 379/88.13 |
| 2003/0229722 A1 | 12/2003 | Beyda ........................ 709/310 |
| 2004/0002359 A1 | 1/2004 | Deas et al. ................. 455/556.2 |
| 2004/0054646 A1 | 3/2004 | Daniell et al. .................. 707/1 |
| 2004/0064514 A1 | 4/2004 | Daniell et al. ............... 709/206 |
| 2004/0086100 A1 | 5/2004 | Moore et al. ........... 379/201.01 |
| 2004/0141594 A1 | 7/2004 | Brunson et al. .......... 379/88.12 |
| 2004/0170263 A1 | 9/2004 | Michael et al. ............ 379/201.1 |
| 2004/0213400 A1 | 10/2004 | Golitsin et al. .......... 379/265.12 |
| 2004/0215723 A1 | 10/2004 | Chadha ....................... 709/206 |
| 2004/0240642 A1 | 12/2004 | Crandell et al. ........... 379/88.22 |
| 2004/0252679 A1 | 12/2004 | Williams et al. ............. 370/356 |
| 2004/0267871 A1 | 12/2004 | Pratley et al. ................ 709/200 |
| 2005/0013421 A1 | 1/2005 | Chavez et al. ............. 379/93.09 |
| 2005/0020288 A1 * | 1/2005 | Davis et al. .................. 455/466 |
| 2005/0027867 A1 | 2/2005 | Mueller et al. .............. 709/227 |
| 2005/0041793 A1 | 2/2005 | Fulton et al. ............ 379/211.01 |
| 2005/0071241 A1 | 3/2005 | Flockhart et al. .............. 705/26 |
| 2005/0074113 A1 | 4/2005 | Mathew et al. ......... 379/265.02 |
| 2005/0080852 A1 | 4/2005 | Kelley et al. ................ 709/206 |
| 2005/0084079 A1 * | 4/2005 | Lang ........................ 379/88.18 |
| 2005/0100145 A1 | 5/2005 | Spencer et al. ........... 379/88.22 |
| 2005/0144291 A1 * | 6/2005 | Frank et al. .................. 709/227 |
| 2005/0190744 A1 * | 9/2005 | Sun et al. .................... 370/352 |
| 2005/0201362 A1 | 9/2005 | Klein et al. .................. 370/352 |
| 2005/0213724 A1 | 9/2005 | O'Brien et al. ......... 379/202.01 |
| 2005/0220286 A1 | 10/2005 | Valdez et al. ........... 379/211.02 |
| 2005/0238157 A1 | 10/2005 | Shaffer et al. ............ 378/211.01 |
| 2005/0251555 A1 | 11/2005 | Little, II ..................... 709/206 |
| 2005/0257142 A1 | 11/2005 | Lai et al. ..................... 715/523 |
| 2005/0259808 A1 | 11/2005 | Andrews et al. ........ 379/265.03 |
| 2005/0275878 A1 | 12/2005 | Hiatt et al. .................. 358/1.15 |
| 2006/0002536 A1 | 1/2006 | Ambrose ................ 379/201.01 |
| 2006/0023695 A1 | 2/2006 | Yarlagadda et al. .......... 370/352 |
| 2006/0025164 A1 | 2/2006 | Wang et al. .................. 455/466 |
| 2006/0026232 A1 | 2/2006 | Malik ......................... 709/204 |
| 2006/0031510 A1 | 2/2006 | Beck et al. .................. 709/226 |
| 2006/0039545 A1 | 2/2006 | Rahman et al. ......... 379/142.01 |
| 2006/0053208 A1 | 3/2006 | Laurila et al. ............... 709/206 |
| 2006/0053225 A1 | 3/2006 | Poikselka et al. ............ 709/227 |
| 2006/0085242 A1 | 4/2006 | Mark ............................. 705/8 |
| 2006/0092970 A1 * | 5/2006 | Song et al. .................. 370/466 |
| 2006/0095575 A1 * | 5/2006 | Sureka et al. ................ 709/227 |
| 2006/0117098 A1 | 6/2006 | Dezonno et al. ............. 709/223 |
| 2006/0140176 A1 | 6/2006 | Farris et al. .................. 370/352 |
| 2006/0142012 A1 | 6/2006 | Kirchhoff et al. ............ 455/445 |
| 2006/0161632 A1 | 7/2006 | Wu et al. ..................... 709/206 |
| 2006/0161872 A1 | 7/2006 | Rytivaara et al. ............ 715/864 |
| 2006/0177030 A1 | 8/2006 | Rajagopalan et al. .. 379/142.07 |
| 2006/0195585 A1 | 8/2006 | Samayamantry ............. 709/227 |
| 2006/0210047 A1 | 9/2006 | Neyman et al. .............. 379/219 |
| 2006/0252444 A1 | 11/2006 | Ozugur ........................ 379/201 |
| 2006/0256816 A1 | 11/2006 | Yarlagadda et al. .......... 370/466 |
| 2006/0265347 A1 | 11/2006 | Caballero-McCann et al. . 707/1 |
| 2006/0276179 A1 | 12/2006 | Ghaffari et al. ........... 455/412.2 |
| 2007/0016647 A1 | 1/2007 | Gupta et al. ................. 709/207 |
| 2007/0042792 A1 | 2/2007 | Perfetto et al. .............. 455/416 |
| 2007/0058637 A1 | 3/2007 | Lo ............................ 370/395.2 |
| 2007/0101144 A1 | 5/2007 | Owen et al. ................. 713/176 |
| 2007/0124371 A1 | 5/2007 | Desai et al. .................. 709/204 |
| 2007/0130260 A1 | 6/2007 | Weintraub et al. ........... 709/204 |
| 2007/0130340 A1 | 6/2007 | Alperin et al. ............... 709/226 |
| 2007/0143433 A1 | 6/2007 | Daigle ........................ 709/207 |
| 2007/0203977 A1 | 8/2007 | Wu et al. ..................... 709/203 |
| 2007/0206738 A1 | 9/2007 | Patel et al. ................ 379/93.24 |
| 2007/0271376 A1 | 11/2007 | Yach ........................... 709/224 |
| 2007/0276937 A1 | 11/2007 | Chavda et al. ............... 709/224 |
| 2008/0002820 A1 * | 1/2008 | Shtiegman et al. ...... 379/211.02 |
| 2008/0005239 A1 | 1/2008 | Podl ............................ 709/204 |
| 2008/0037583 A1 | 2/2008 | Dawes et al. ................ 370/467 |
| 2008/0043986 A1 * | 2/2008 | Darby ................... 379/265.09 |

| | | | | |
|---|---|---|---|---|
| 2008/0056454 | A1 | 3/2008 | Lahtiranta et al. | 379/67.1 |
| 2008/0059579 | A1 | 3/2008 | Maes | 709/209 |
| 2008/0062970 | A1 | 3/2008 | Picard et al. | 370/352 |
| 2008/0065974 | A1 | 3/2008 | Campbell | 715/200 |
| 2008/0075241 | A1 | 3/2008 | Kent et al. | 379/88.12 |
| 2008/0101224 | A1 | 5/2008 | Khasnabish | 370/230 |
| 2008/0104169 | A1 | 5/2008 | Combel et al. | 709/204 |
| 2008/0148154 | A1 | 6/2008 | Burrell et al. | 715/733 |
| 2008/0155080 | A1 | 6/2008 | Marlow et al. | 709/223 |
| 2008/0212762 | A1* | 9/2008 | Gray et al. | 379/211.01 |
| 2008/0247530 | A1 | 10/2008 | Barton et al. | 379/216.01 |
| 2008/0249778 | A1* | 10/2008 | Barton et al. | 704/270 |
| 2008/0261630 | A1* | 10/2008 | Wormald et al. | 455/466 |
| 2008/0263459 | A1* | 10/2008 | Altberg et al. | 715/757 |
| 2008/0298566 | A1* | 12/2008 | Scott et al. | 379/93.01 |
| 2008/0299948 | A1 | 12/2008 | Rosener | 455/412.2 |
| 2008/0313329 | A1 | 12/2008 | Wang et al. | 709/224 |
| 2008/0317223 | A1* | 12/2008 | Koch | 379/88.21 |
| 2008/0320148 | A1 | 12/2008 | Capuozzo et al. | 709/227 |
| 2009/0009343 | A1 | 1/2009 | Boyer et al. | 340/573.1 |
| 2009/0029690 | A1* | 1/2009 | Levien et al. | 455/417 |
| 2009/0060155 | A1* | 3/2009 | Chingon et al. | 379/142.04 |

FOREIGN PATENT DOCUMENTS

| | | |
|---|---|---|
| EP | 0 641 112 A2 | 3/1995 |
| EP | 0881802 | 12/1998 |
| EP | 1499097 | 1/2005 |
| EP | 1551 164 | 7/2005 |
| EP | 921659 | 8/2005 |
| EP | 1589733 | 10/2005 |
| EP | 1657871 | 5/2006 |
| EP | 1720330 | 11/2006 |
| JP | 5290060 | 11/1993 |
| JP | 8032618 | 2/1996 |
| JP | 2000/049851 | 2/2000 |
| JP | 2004/070752 | 3/2004 |
| JP | 2005159439 | 6/2005 |
| JP | 2006/127142 | 5/2006 |
| WO | WO 97/18661 A1 | 5/1997 |
| WO | WO 99/18697 A1 | 4/1999 |
| WO | WO 00/16207 | 3/2000 |
| WO | WO 02/50722 | 6/2002 |
| WO | WO03/039128 | 5/2003 |
| WO | WO 2004/063854 | 7/2004 |
| WO | WO 2005/006165 | 1/2005 |
| WO | WO 2005/048121 | 5/2005 |
| WO | WO 2005/083995 | 9/2005 |
| WO | WO 2005/109844 | 11/2005 |
| WO | WO 2006/082506 | 8/2006 |
| WO | WO 2006/118651 | 11/2006 |

OTHER PUBLICATIONS

Kaplan, "Integrated messaging services in an ISDN PBX network," IEEE Conference Publication, n 288, 1988, p. 201-205, 1988. Ei Compendex® Dialog® File No. 278 Accession No. 5775289.

Bond, "An open architecture for next-generation telecommunication services [instant messaging]," CI ACM Transactions on Internet Technology, vol. 4, Issue 1 (Feb. 2004), pp. 83-123, ISSN: 1533-5399.

Business Wire, "NEC America, Inc. and Cisco Systems, Inc. Demonstrate Feature Transparent Voice over IP PBX Networking", in Business Wire, pp. 0142, Feb. 11, 1999.

Business Wire "Essential Communications Announces Its Highest Capacity 32-Port HIPPI Switch (with Hunt Group Definition and Troubleshooting)", Business Wire, pp. 5040233, May 4, 1998.

Caporuscio et al., "Design and evaluation of a support service for mobile, wireless publish/subscribe C4 applications [via networking and multiparty-instant messaging, electronic auctions]", Transactions on Software Engineering, IEEE Transactions, Dec. 2003, vol. 29, Issue 12, pp. 1059-1071.

Communications News, "Conversant software [networking] solves communications and productivity problems with fourth generation PBX", Communications News, vol. 22, No. 7, pp. 56, Jul. 1985.

EDGE, "Ethernet: Lucent Technologies Unveils Cajun P120 Workgroup [Hunt Group] Switch," EDGE: Work-Group Computing Report, p. NA, Apr. 19, 1999. Gale Group PROMT®. Dialog® File No. 16 Accession No. 6279610.

EDGE1995, Ascom Timeplex unveils ST-20 . . . featuring stand-alone branching with . . . hunt-group capability for help desks (Product Announcement)], in EDGE, on & about AT&T, vol. 10, No. 364, p. 37(1), Jul. 17 1995. Gale Group Trade and Industry Database™. Dialog® File No. 148 Accession No. 8081315.

EDGE1996, "Hypercom advances migration to new WAN technologies [supporting Hunt Group and Call Negotiation]," (Product Announcement), in EDGE: Work-Group Computing Report, vol. 7, p. 19(1), Apr. 8 1996. Gale Group Trade and Industry Database™, Dialog® File No. 148 Accession No. 8661192.

Jiang et al., "Integrating Internet telephony services [via networking, instant messaging]," Internet Computing, IEEE Publication Date: May-Jun. 2002, vol. 6, Issue: 3, pp. 64 -72, ISSN: 1089-7801. Digital Object Identifier: 10.1109/MIC.2002.1 003133. Posted online: Aug. 7, 2002 00:52:07.0.

Ludwig, "Integration of CAD/CAE with multimedia teleconferencing and messaging via broadband networks and shared resource servers," Systems Integration, 1990. Systems Integration '90., Proceedings of the First International Conference, Date: Apr. 23-26, 1990, pp. 136-143.

Milstead, et al., "The digital PBX: current and future views of applications for [networking] information management," Conference on Private Switching Systems and Networks, 1988, Publication Date: Jun. 21-23, 1988, pp. 93-98, INSPEC Accession No. 3239158, Posted online: Aug. 6, 2002 15:56:19.0.

PBI2005, "ShoreTel Releases New Capabilities for Distributed Enterprises and International Offices C13 [with Hunt Group and Unified Messaging]," in PBI—Telecomtactics Insider, Feb. 15, 2005. World Reporter. Dialog® File No. 20 Accession No. 40684664.

PR Newswire, "Inter-Tel Announces Small-Office IP . . . [with PBX Hunt Group] Networking System," in PR Newswire, Jun. 22, 2000. World Reporter. Dialog® File No. 20 Accession No. 11618675.

PR Newswire 2002, "New VNCI Video Technology Delivers Maximum Efficiency and Connectivity [with Circular Hunt Group Technology]," PR Newswire, p. NETU01605032002, Mar. 5, 2002. Gale Group PROMT® Dialog® File No. 16 Accession No. 9490114.

Yin, "Voice menu navigation . . . with [instant messaging] cross-device user experience integration," Symposium on User Interface Software and Technology, Proceedings of the 18th annual ACM symposium on User interface software and technology, pp. 187-190 (2005) ISBN:159593-271-2.

International Search Report for PCT/US2008/054704.

International Search Report for PCT/US2008/063914.

International Search Report for PCT/US2008/054738.

International Search Report for PCT/US2008/054731.

International Search Report for PCT/US2008/055130.

International Search Report & Written Opinion PCT/US08/63921 dated May 19, 2009.

International Search Report & Written Opinion PCT/US08/63941 dated Feb. 18, 2009.

Vijay K.Gurbani and Xian-He Sun, Article from the 2004 Global Telecommunications Conference Entitled: "Extensions To An Internet Signaling Protocol To Support Telecommunication Services", pp. 1640-1643.

International Search Report for PCT/US2008/054699.

International Search Report for PCT/US2008/62250.

Kellogg S. Booth et al., The "Mighty Mouse" Multi-Screen Collaboration Tool; ACM; 1-57113; vol. 4, Issue 2, pp. 209-212 (2002).

Office Action Summary dated May 19, 2009 for U.S. Appl. No. 11/749,631, filed May 16, 2007.

Office Action Summary For Applications Under Accelerated Examination dated Jul. 1, 2009 for U.S. Appl. No. 12/247,910, filed Oct. 8, 2008.

Office Action Summary For Applications Under Accelerated Examination dated Jul. 6, 2009 for U.S. Appl. No. 12/247,949, filed Oct. 8, 2008.

Office Action Summary dated Jul. 2, 2009 for U.S. Appl. No. 11/749,657, filed May 16, 2007.

* cited by examiner

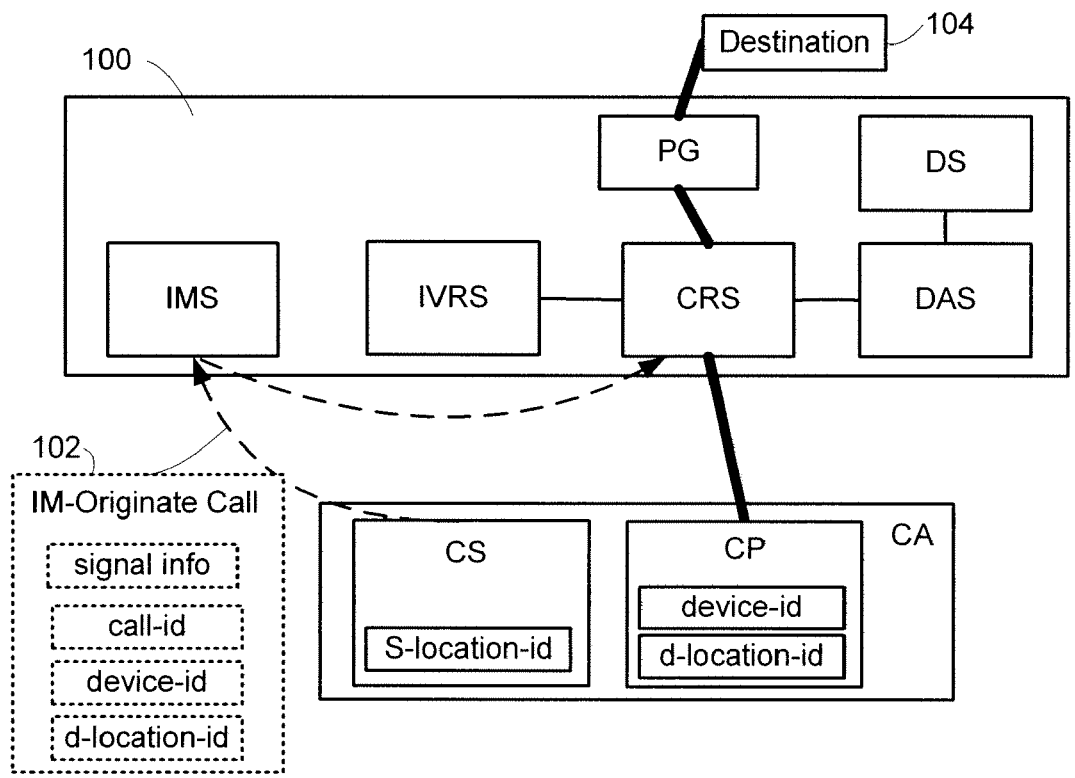
FIGURE 1 (Outgoing call)
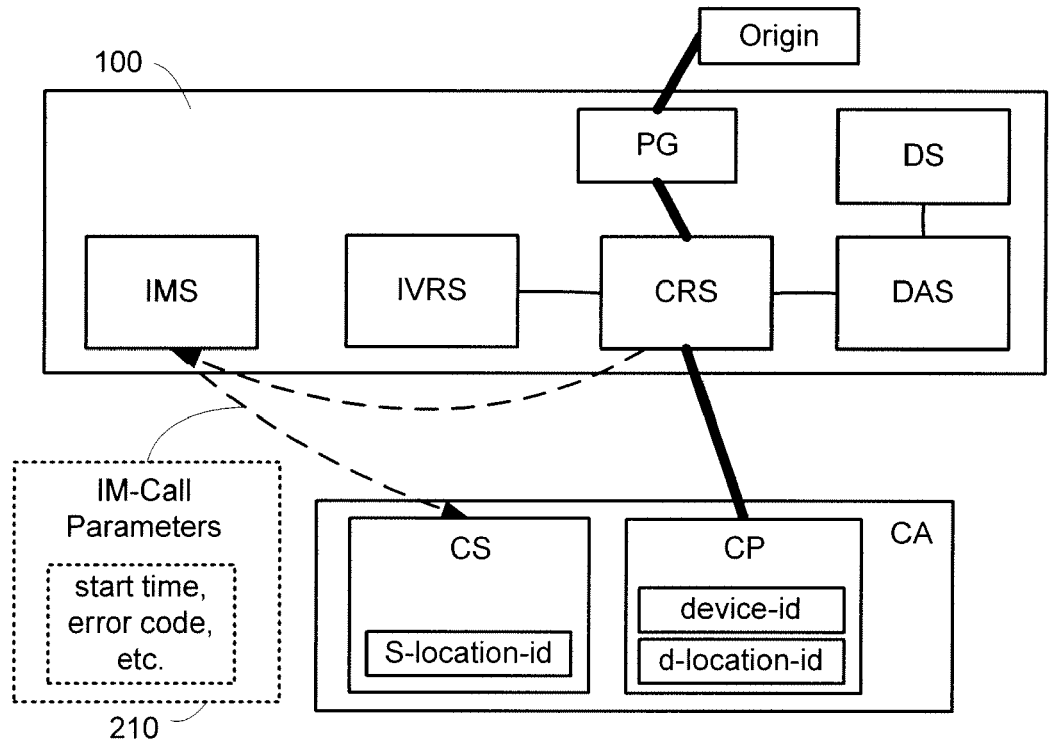
FIGURE 2 (Incoming call)

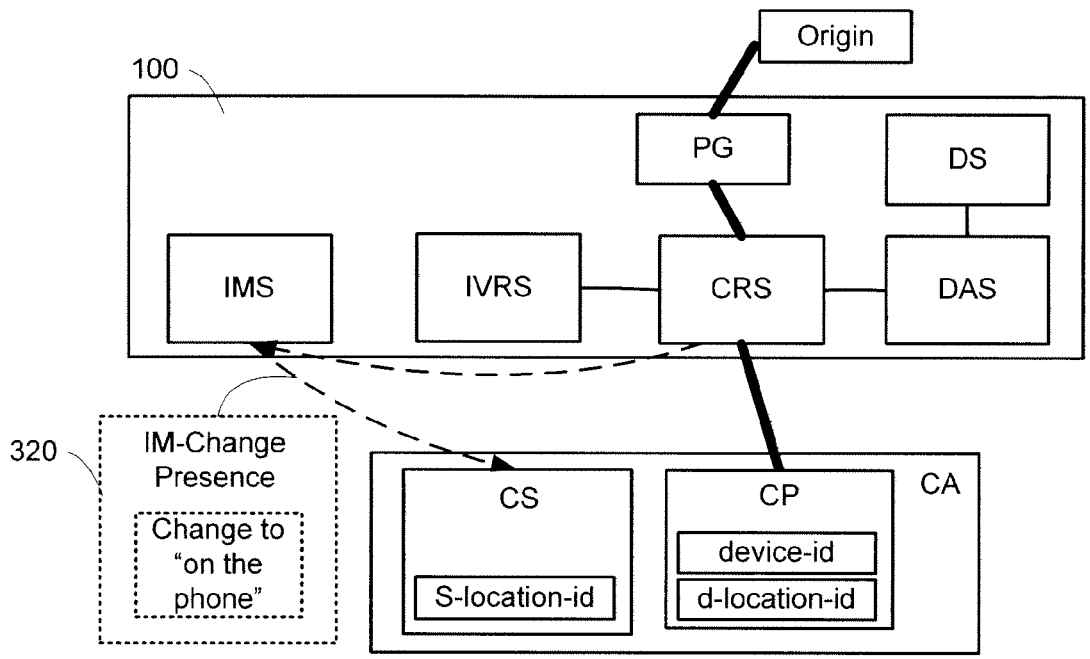
FIGURE 3 (Changing Presence State)
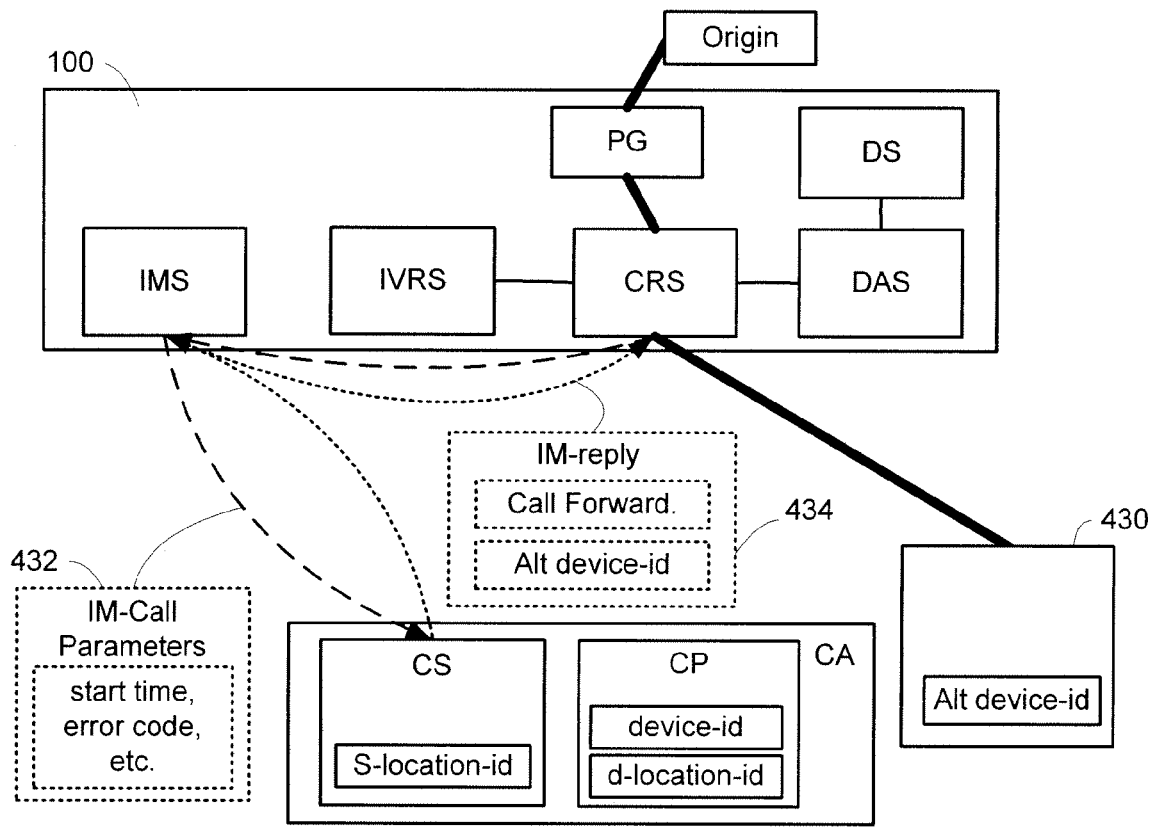
FIGURE 4 (Call Forwarding)

SYSTEMS AND METHODS FOR PHONE CALL MANAGEMENT

CROSS-REFERENCE TO RELATED APPLICATION

The present application is a continuation of U.S. patent application Ser. No. 11/743,059 filed on May 1, 2007, entitled "Systems And Methods For Phone Call Management," which is hereby incorporated by reference in its entirety.

BACKGROUND OF THE INVENTION

This application relates to communication and in particular relates to integration of existing communication formats in a manner that provides additional functionality to a user.

Various communication formats are commonly used for electronic communication. In particular, email and instant messenger formats are commonly used for communication through a personal computer (PC) or other device. Telephone communication is generally performed using a dedicated stand-alone telephone device (desktop telephone, cell phone, or other device). In some cases Voice over Internet Protocol (VoIP) may allow telephone communication using a PC or similar device. Generally, some additional hardware is needed to use a PC in this way (e.g. an IP handset). Where a telephone is integrated with a PC in this way (as a softphone) telephone calls are generally made on a peer-to-peer basis. Softphones have certain advantages including the ability to manage telephone communication in ways that are more difficult from a traditional telephone. For example, a call may be made from an address book simply by clicking on the phone number, instead of punching the number into a keypad. A call log may be automatically maintained. Because such features are not generally available with stand-alone telephones, there is a need for better integration of telephone and computer based communication systems to provide additional functions with stand-alone telephones.

SUMMARY OF THE INVENTION

An apparatus for integrated voice and text communication according to an embodiment of the present invention comprises: a call routing server that is connected to a client telephone; an instant messenger server that is in communication with the call routing server and is also in communication via instant messenger with a client device that is associated with the client telephone; and wherein the call routing server manages calls to and from the telephone in response to commands received from the client device via the instant messenger server.

A method of integrating telephone and computer communication according to an embodiment of the present invention comprises: associating a telephone with a client device, the client device having instant messenger communication capability; and managing operation of a call routing server connected to the telephone by instant messenger commands send from the client device.

A method of managing telephone calls to and from a telephone according to an embodiment of the present invention comprises: sending a first instant messenger communication from a client device associated with the telephone to a call routing server that is connected to the telephone, the first instant messenger communication containing information regarding an outgoing telephone call including a destination; the call routing server placing the outgoing telephone call to the destination and connecting the telephone to the destination in response to the first instant messenger communication; and in response to the call routing server receiving an incoming telephone call directed to the telephone, sending a second instant messenger communication to the client device that is associated with the telephone, the second instant messenger communication including information regarding the incoming telephone call.

BRIEF DESCRIPTION OF THE DRAWINGS

FIG. 1 shows a communication system during placement of an outgoing call with client software using IM communication to manage telephone communication through the call routing server.

FIG. 2 shows the communication system as an incoming call is received including the sending of an IM by the call routing server, the IM including call parameters such as start time, error code etc.

FIG. 3 shows the communication system updating presence information for a user when an incoming telephone call is accepted.

FIG. 4 shows the communication system performing a call forwarding operation, the call forwarding operation initiated by client software sending an IM to the call routing server that commands the server to forward the call, and identifying the destination to which the call is to be forwarded.

DETAILED DESCRIPTION OF ILLUSTRATED EMBODIMENTS

According to an embodiment of the present invention, a user has both a client computer and a stand-alone telephone, and manages telephone calls to and from the telephone through the client computer. This provides various features associated with computer management of telephone communication (address book, phone log etc.) while still using legacy telephone technology including stand-alone telephones. Instead of using software on a Personal Computer (PC) as a softphone to replace a traditional telephone, software on a PC may be used to add functionality to a legacy telephone. In this way, if the PC is not used, the telephone may still be used as a telephone in the usual way. Thus, if the PC is not booted up, or if network problems affect communication with the PC, the telephone still functions. When the PC is operating normally, software gives the user many of the advantages of a softphone.

In one example, telephone calls are routed through a Call Routing Server (CRS) and the CRS is managed by Client Software (CS) on a suitable platform such as a PC. One convenient format for communication between the CS and the CRS is Instant Messenger (IM). Several instant messenger formats are currently in widespread use and any of these formats, or similar formats, may be used. Suitable formats include, but are not limited to, ICQ™, AIM™, MSN™, XMPP and Jabber™. A CRS may be configured to receive commands from a CS via IM and to manage telephone communication to and from one or more telephones in response to the IM communication received.

FIG. 1 shows an example of a communication system that uses IM communication to manage telephone calls. A server portion 100 of the communication system includes an Instant Messenger Server (IMS), an Interactive Voice Response Server (IVRS), a Call Routing Server (CRS) a Data Access Server (DAS), a dedicated (or distributed) Data Store (DS) and at least one Phone Gateway (PG). Server portion 100 may also include other components that are not shown here for clarity. For example, more than one of any of the servers listed may be provided.

The IMS comprises computer hardware (CH) and software which includes a data exchange module (DEM), a message handling module (MHM), an authentication and authorization module (AAM) and a presence manager module (PMM). The presence manager module generally maintains presence information regarding users through instant messenger communication.

The IVRS comprises computer hardware (CH) and software which includes an interactive voice response (IVR) module, a call processing module (CPM), a data exchange module (DEM), a messaging module (MM) and a authentication and authorization module (AAM). The IVRS provides the user with information regarding telephone management. The IVRS may inform the user about call status and may obtain user preferences through a phone menu.

The CRS comprises computer hardware (CH) and software which includes a call routing module (CRM), a data exchange module (DEM), an authentication and authorization module (AAM), a phone registration module (PRM) and a messaging module (MM). The CRS is configured so that the CRM may be operated according to commands received by instant messenger.

The DAS comprises computer hardware (CH) and software which includes a data access module (DAM), authentication and authorization module (AAM) and data exchange module (DEM). The DAS acts as a gateway for accessing data stored in the DS.

The DS comprises data storage hardware which could be one or more computer hard drive, flash drive, NAS, SUN or any other data storage device or devices and data management software i.e. data-base management system, file system, etc. The DS is used to store data used by the other servers.

Server portion 100 of the communication system may consist of software on a single hardware platform or may consist of software extending over several hardware platforms. Where several platforms are used, the servers remain in communication with each other using IP protocol. The term "server" is generally used to describe software that performs server functions in relation to a client and is not limited to any particular hardware configuration, though in some cases a server may operate on a dedicated hardware platform (sometimes also referred to as a server). In one example, the server portion consists of several software servers on a single hardware platform, each server performing a different function.

Server portion 100 may be connected to one or more Client Agents (CAs). Only one CA is shown in FIG. 1 for clarity, though in many systems a server portion serves many CAs. The CA includes a CS operating on a PC in the present example, and a Client Phone (CP), which is a stand-alone telephone in the present example. In other examples, the CP may be a softphone operating on the same PC as the CS. In other examples, the CA may be a mobile device having both IM and telephone capability.

The CA has a unique identifier (agent-id), and any other CAs that are connected to server portion 100 also have unique identifiers. The CS has a unique location identifier (s-location-id), and any other CSs that are connected to the server portion also have unique location identifiers. The CP has a unique device identifier (device-id) and a device location identifier (d-location-id), and any other CPs that are connected to the server portion also have unique device and location identifiers. In addition, all telephone calls passing through the CRS have a unique identifier (call-id) and each instant message contains the sender's signature and is uniquely identifiable.

Communication between components of the present system may be secure (encrypted) or not secure (unencrypted). A user may select a security setting according to the level of security desired.

The CA is connected to the IMS for communication by instant messenger. The CP is registered with the CRS, so that the CRS can select the CP as a destination for a telephone call and recognizes the CP as a valid origination point for telephone call. The CS is associated with the CP and information that the two components are linked may be stored in the DS. The CS may be linked to the CP by associating the CP's d-location-id and device-id with the s-location-id of the CS. In some cases, these are associated by a person who configures the system. In some cases, there may be a default scheme that associates a particular CP with a CA.

During startup of the CS, the CS requests information about the CRS and IMS from the DS. This allows the CS to communicate with the CRS via instant messenger. The CRS then recognizes IM communication from the CS as commands and manages telephone calls to and from the CP according to those commands.

FIG. 1 shows the situation where a user makes an outgoing call from the CP using the CS. For example, instead of dialing a number directly on the CP, a user may consult an address book through the CS and dial the number directly from the address book. In response to the user's selection of a particular number to dial, the CS sends an IM 102 "IM-Originate call" that contains information about the call to be placed. In particular, IM 102 contains signal information required by call control protocol, call-id, device-id and d-location-id for the CP and s-location-id for the CS. In other examples, the CS may send device-ids and d-location-ids for multiple devices. For example, the user may wish to initiate a conference call by calling a list of people together.

IM 102 is sent from the CS to the IMS, where it is directed to the CRS. When the CRS receives IM 102 from the CS, it initially establishes a call between the IVRS and the CP (based on the device-id provided in the IM 102). For example, the CP may ring, indicating a call so that the user picks up the handset. The IVRS then plays a prerecorded message to the user. For example, "Your call is being placed, please hold." While this message is being played, the IVRS initiates a call to the destination 104 (telephone number) indicated by the user via the CRS. In the example of FIG. 1, the outgoing call goes through the PG, though in other cases the call may go to another CA that is connected to server portion 100. When the call from the CRS to destination 104 is connected (e.g. when the person at the other end picks up the phone), the prerecorded message stops and the IVRS connects the two calls so that the user of the CP is in telephone contact with the destination. If the call to destination 104 is not successful, the CRS informs the IVRS and the IVRS may play a prerecorded message to the user indicating that the call was not successful.

FIG. 2 shows the communication system of FIG. 1 during receipt of an incoming call. A call is received by the CRS through the PG. The call contains information regarding the destination. In this case the destination is the CP, identified by device-id or d-location-id. The CRS directs the call to the CP causing the CP to ring, or otherwise indicate an incoming call. In addition, the CRS sends an IM 210, "IM-Call parameters," to the CS via the IMS. IM-Call parameters contains information about the call including start time, error code information etc. If the call is sent to multiple destinations, IM 210 may be sent to all destinations. Also, if the call is transferred the transfer destination receives the IM 210. Other events such as the call being placed on hold, answered or hung up may also cause the CRS to send an IM to the CA or other CAs.

When IM 210 is received by the CA, the CRS is identified so that the CA can respond with an appropriate command according to the user's preferences. The user may be presented with information about the incoming call on screen and also presented with options such as "transfer the call," "put call on hold," or "hang-up the call," etc. The user can respond by picking up the handset of the CP or can respond through the CS. When the user responds through the CS, the CS sends an IM to the CRS that identifies the call-id and specifies what action the CRS should take with the call.

One feature of instant messenger systems that is useful in efficient communication is presence awareness. Generally, IM systems maintain presence state information for all users. A user may be assigned a presence state from a finite set of presence states. A user's presence state may be used to manage communication. When the user is on the phone (i.e. has placed an outgoing call or accepted an incoming call), the user's presence state may be updated accordingly. FIG. 3 shows such an updating operation that occurs after the user accepts the telephone call of FIG. 2. Because the user has accepted the incoming telephone call, the CRS sends an IM 320 (IM-Change presence) to the CS, via the IMA, requesting the CS to update presence information for the user. In this case, the requested update is to change the user's presence state to "on the phone." In other cases, a request may be made to change the user's presence state to a different state such as "away," "available," or some other state. The CS makes this change in response and the change may be reflected in the status of the user as shown to other people connected to the server portion. For example, if the user was involved in an IM exchange, the user's status would change to "on the phone" and other participants would see the change and would be able to act accordingly. Any time the user accepts a call, transfers away a call, places a call on hold, hangs up a call or otherwise changes the user's condition, the CRS may send an IM to the CS requesting that the CS change the user's presence state.

An alternative outcome to that shown in FIGS. 2 and 3 (where the user accepts the incoming call) is shown in FIG. 4. In the example of FIG. 4, the user of the CA does not accept the call. Instead the user forwards the call to an alternate device 430 with a different device identifier "Alt device-id." As in the example, the CRS sends an IM 432, "IM-Call parameters" to the CS, via the IMS. This may cause the CS to display various options to the user including forwarding the call. Alternatively, the user may have selected an option to automatically forward the call to alternate device 430. In either case, the CS sends an IM 434 "IM-reply" to the CRS, via the IMS. IM 434 includes the command to forward the call and the destination to which the call is to forwarded (Alt device-id). The CRS may then send the call to alternate device 430 in the same manner as previously described (sending an IM) or otherwise. If the call is accepted by the user of alternate device 430, the CRS connects the incoming call to alternate device 430. A call may also be transferred away after a user has initially accepted the call in a manner similar to that described above.

In addition to the operations shown, the CS may send an IM command to the CRS to add more callers to an ongoing telephone call. Thus, multiple callers may be conferenced into a conference call using a PC interface instead of using a telephone interface, which is often not as user friendly. The CS may send an IM command to the CRS to place an ongoing call on hold or to hang up the call.

While the examples discussed above show a single CP controlled through a CRS by a CP, in other examples one CS may control more than one CP and such CPs may not be close to the CS. For example, a single PC in a call-center may control the distribution of calls to various employees, with instant messenger used as the communication format to command the CRS (or CRSs).

While the examples discussed above include a PC and a stand-alone telephone, the methods described may be used with other hardware also. Telephone calls to and from a softphone may also be managed as described.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims.

What is claimed is:

1. A method of managing telephone calls to and from a user's telephone comprising:
   sending a first instant messenger communication from a client device associated with the telephone to a call routing server that is connected to the telephone, the first instant messenger communication containing information regarding an outgoing telephone call including a destination;
   the call routing server placing the outgoing telephone call to the destination and connecting the telephone to the destination in response to the first instant messenger communication; and
   in response to the call routing server receiving an incoming telephone call directed to the telephone, sending a second instant messenger communication to the client device that is associated with the telephone, the second instant messenger communication including information regarding the incoming telephone call;
   wherein the incoming telephone call is transferred in response to an instant messenger command sent from the client device to the call routing server, the instant messenger command being dependent on presence information regarding the user.

2. The method of claim 1 further comprising connecting the telephone to an interactive voice response server while the call routing server places the outgoing telephone call, prior to connecting the telephone to the destination, the interactive voice response server providing voice information to the telephone.

3. The method of claim 1 wherein another incoming telephone call is placed on hold in response to another instant messenger command sent from the client device to the call routing server, the another instant messenger command being dependent on presence information regarding the user.

4. The method of claim 1 wherein another incoming telephone call is hung-up in response to another instant messenger command sent from the client device to the call routing server, the another instant messenger command being dependent on presence information regarding the user.

5. A system for managing telephone calls to and from a user's telephone comprising:
   a client device associated with the telephone configured to send a first instant messenger communication to a call routing server that is connected to the telephone, the first instant messenger communication containing information regarding an outgoing telephone call including a destination;

the call routing server configured to place the outgoing telephone call to the destination and connecting the telephone to the destination in response to the first instant messenger communication; and the call routing server sending a second instant messenger communication to the client device associated with the telephone in response to the call routing server receiving an incoming telephone call directed to the telephone, the second instant messenger communication including information regarding the incoming telephone call;

wherein the incoming telephone call is transferred in response to an instant messenger command sent from the client device to the call routing server, the instant messenger command being dependent on presence information regarding the user.

6. The system of claim 5 wherein the call routing server connects the telephone to an interactive voice response server while the call routing server places the outgoing telephone call prior to connecting the telephone to the destination, the interactive voice response server providing voice information to the telephone.

7. The system of claim 5 wherein the call routing server places another incoming telephone call on hold in response to another instant messenger command sent from the client device to the call routing server, the another instant messenger command being dependent on presence information regarding the user.

8. The system of claim 5 wherein the call routing server hangs up another incoming telephone call in response to another instant messenger command sent from the client device to the call routing server, the another instant messenger command being dependent on presence information regarding the user.

* * * * *